US011671037B1

(12) United States Patent
Li et al.

(10) Patent No.: US 11,671,037 B1
(45) Date of Patent: Jun. 6, 2023

(54) EFFICIENCY OPTIMIZATION OF MAXIMUM TORQUE PER AMPS CONTROL FOR SYNCHRONOUS MOTORS

(71) Applicant: Rockwell Automation Technologies, Inc., Mayfield Heights, OH (US)

(72) Inventors: Bing Li, Mequon, WI (US); Brian J. Seibel, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/737,826

(22) Filed: May 5, 2022

(51) Int. Cl.
*H02P 6/08* (2016.01)
*H02P 25/022* (2016.01)

(52) U.S. Cl.
CPC .............. *H02P 6/08* (2013.01); *H02P 25/022* (2013.01); *H02P 2207/055* (2013.01)

(58) Field of Classification Search
CPC ..... H02P 6/08; H02P 25/022; H02P 2207/055
See application file for complete search history.

(56) References Cited

U.S. PATENT DOCUMENTS

| 2006/0055363 | A1* | 3/2006 | Patel ................. | H02P 21/10 318/757 |
| 2009/0284195 | A1* | 11/2009 | Gallegos-Lopez ..... | H02P 21/06 318/400.07 |

FOREIGN PATENT DOCUMENTS

CN 112468038 A 3/2021

* cited by examiner

*Primary Examiner* — Zoheb S Imtiaz
(74) *Attorney, Agent, or Firm* — Kunzler Bean & Adamson; Scott D. Thorpe

(57) ABSTRACT

For improving Maximum Torque per Amps (MTPA) control, a method generates an offline MTPA curve based on an autotune test for a motor, which is used as offline MTPA control in order to run a motor at a high efficiency operation point. Another online method generates a search zone for the MTPA curve for a given torque point. The search zone includes an upper D-axis reference current and a lower D-axis reference current for the given torque point. The method iteratively modifies a D-axis reference current between the upper D-axis reference current and the lower D-axis reference current of the search zone. The method modifies a Q-axis reference current to output the given torque. The method updates a corresponding current pair of the given torque point to the modified D-axis reference current and the modified Q-axis reference current with a lowest current amplitude to improve MTPA control of the motor.

20 Claims, 18 Drawing Sheets

EFFICIENCY OPTIMIZATION OF MAXIMUM TORQUE PER AMPS CONTROL FOR SYNCHRONOUS MOTORS

BACKGROUND INFORMATION

The subject matter disclosed herein relates to improving and/or optimizing Maximum Torque per Amps (MTPA) control.

BRIEF DESCRIPTION

A method for improving MTPA controls disclosed. The method generates an offline MTPA curve based on an autotune test for a motor. The method generates a search zone for the MTPA curve for a given torque point. The search zone includes an upper D-axis reference current and a lower D-axis reference current for the given torque point. The MTPA curve comprises torque points of torques for current pairs of a Q-axis current and a D-axis current for the motor. The method iteratively modifies a D-axis reference current between the upper D-axis reference current and the lower D-axis reference current of the search zone. The method modifies a Q-axis reference current to output the given torque. The method updates a corresponding current pair of the given torque point to the modified D-axis reference current and the modified Q-axis reference current with a lowest current amplitude to further improve the efficiency of the motor.

An apparatus for improving MTPA control is disclosed. The apparatus includes a controller. The controller generates an offline MTPA curve based on an autotune test for a motor. The controller generates a search zone for the MTPA curve for a given torque point. The search zone includes an upper D-axis reference current and a lower D-axis reference current for the given torque point. The MTPA curve comprises torque points of torques for current pairs of a Q-axis current and a D-axis current for the motor. The controller iteratively modifies a D-axis reference current between the upper D-axis reference current and the lower D-axis reference current of the search zone. The controller modifies a Q-axis reference current to output the given torque. The controller updates the corresponding current pair of the given torque point to the modified D-axis reference current and the modified Q-axis reference current with a lowest current amplitude to further improve the efficiency of the motor.

A system for improving MTPA controls disclosed. The system includes a motor and a motor drive. The motor drive generates an offline MTPA curve based on an autotune test for a motor. The motor drive generates a search zone for the MTPA curve for a given torque point. The search zone includes an upper D-axis reference current and a lower D-axis reference current for the given torque point. The MTPA curve comprises torque points of torques for current pairs of a Q-axis current and a D-axis current for the motor. The motor drive iteratively modifies a D-axis reference current between the upper D-axis reference current and the lower D-axis reference current of the search zone. The motor drive modifies a Q-axis reference current to output the given torque. The motor drive updates the corresponding current pair of the given torque point to the modified D-axis reference current and the modified Q-axis reference current with a lowest current amplitude to further improve the efficiency of the motor.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
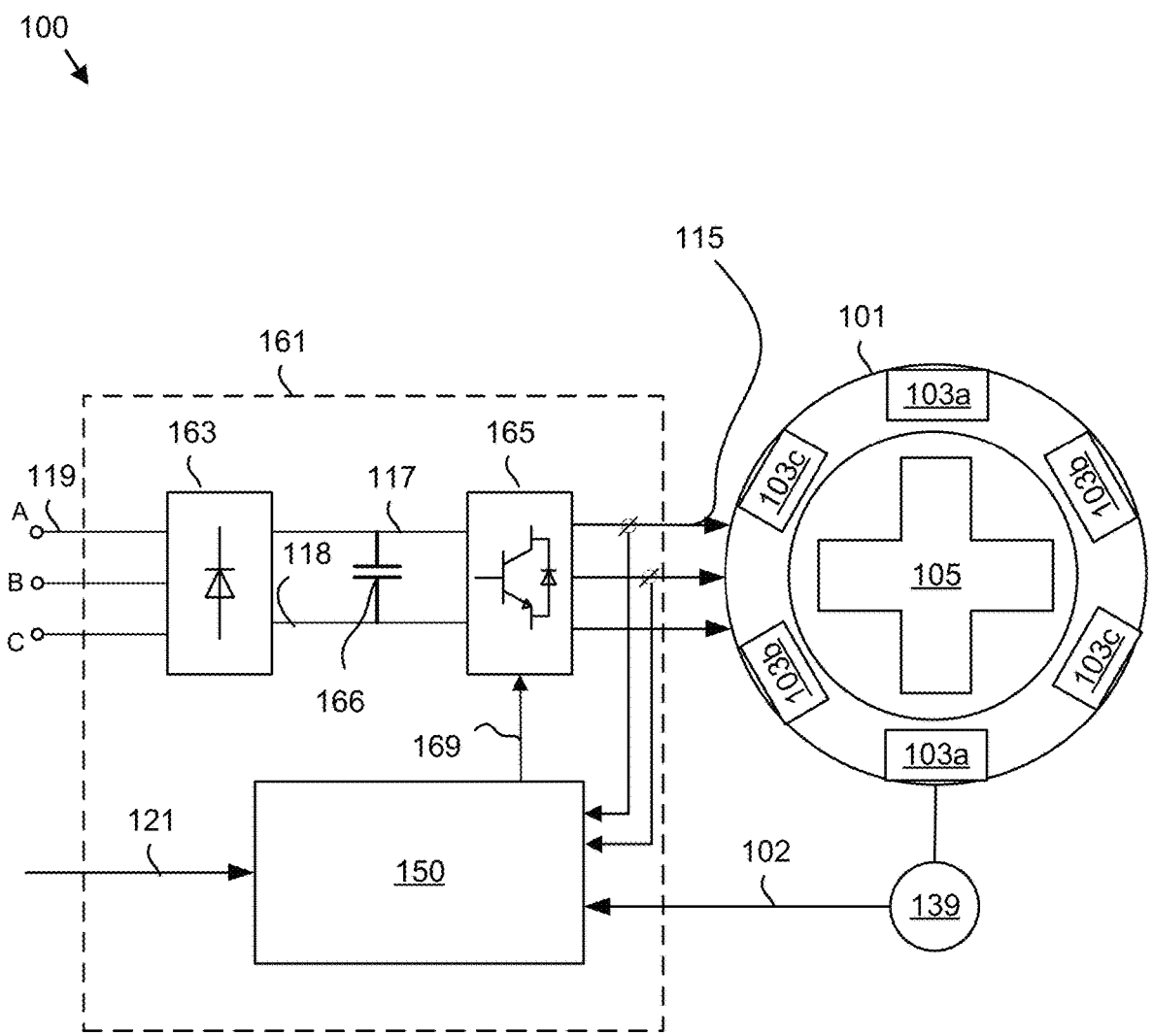
FIG. 1A is a schematic diagram of motor system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

Program code for carrying out operations for aspects of the present invention may be written in any combination of one or more programming languages, including an object-oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1A is a schematic diagram of a motor system 100. The system 100 includes a motor 101 and a motor drive 161. The motor 101 may be a salient motor, a synchronous reluctance motor, a synchronous machine, a permanent magnet motor, and the like. The motor 101 is controlled by the motor drive 161.

In the depicted embodiment, the motor 101 includes a rotor 105 and a plurality of coils 103a-c. The motor drive 161 may direct electric currents with an output voltage 115 through the coils 103a-c to generate a motor flux that drives the rotor 105.

The motor drive 161 may control the motor 101 to generate a specified torque at a specified angular velocity in response to a limited torque reference 121. The limited torque reference 121 may specify the torque for the motor 101 and/or the angular velocity for the motor 101. The motor drive 161 may be required to control the motor 101 within a range of torques and/or angular velocities for a variety of loads base on the limited torque reference 121.

Figure 4:
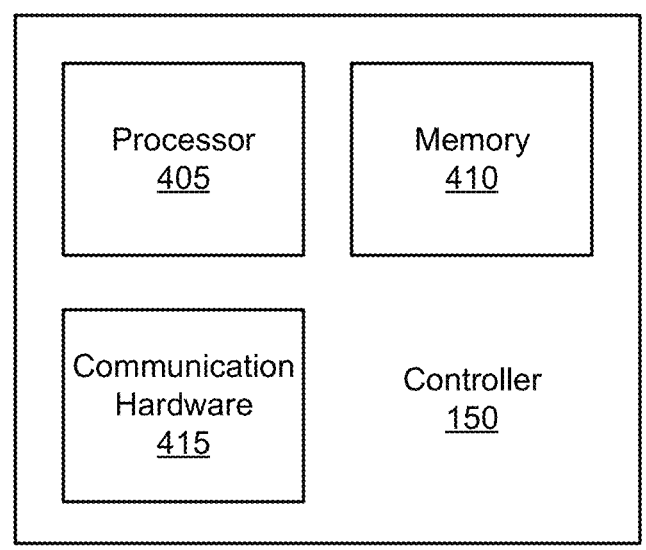
FIG. 4 is a schematic block diagram of a controller according to an embodiment.

In the depicted embodiment, the motor drive 161 includes a rectifier and/or converter 163, referred to hereafter as a rectifier 163, an inverter 165, a bus capacitor 166, and a controller 150. The converter 163 supplies a Direct Current (DC) bus voltage 117 and a neutral 118 to the inverter 165. A capacitor 166 may filter the DC bus voltage 117. The controller 150 may include a processor as shown in FIG. 4. The controller 150 may produce the gate signals 169 to control the output voltage 115 supplied by the inverter 165, and therefore control the motor 101. The system 100 may include an encoder 139 that generates a position signal 102. The position signal 102 may be used accurately control the motor 101. In a certain embodiment, at least a portion of the motor drive 161 comprises one or more of hardware and executable code, the executable code stored on one or more computer readable storage media.

Figure 1B:
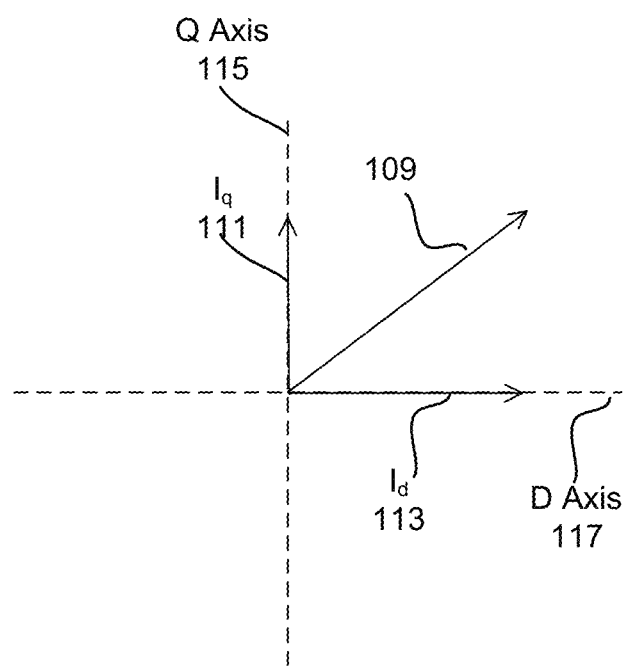
FIG. 1B is a drawing direct axis currents and quadrature axis currents according to an embodiment.

FIG. 1B is a drawing of direct axis (D-axis) currents $I_d$ 113 and quadrature axis (Q-axis) currents $I_q$ 111 that are supplied to the motor 101 by the inverter 165. The D-axis current 113 generates flux along a field winding or D-axis 117 for the motor 101. The Q-axis current 111 generates torque along a torque or Q-axis 115. The combined D-axis current 113 and the Q-axis current 111 have a current amplitude 109.

An autotune test may be performed for the motor 101. The autotune test may be a default operation. The autotune test may be performed at a startup of the motor 101. The autotune process may generate an offline MPTA curve that is used to select the Q-axis current 111 and D-axis current 113 for a given torque that minimizes the current amplitude 109. The offline MTPA curve is shown in more detail in FIGS. 2D-E.

Unfortunately, the offline MTPA curve generated during the autotune test may include inaccuracies. As a result, the Q-axis current 111 and D-axis current 113 selections are less than optimal and the efficiency of the motor 101 is decreased. The embodiments improve the MTPA curve estimates as will be described hereafter. As a result, the efficiency of the motor 101 is improved.

Figure 1C:
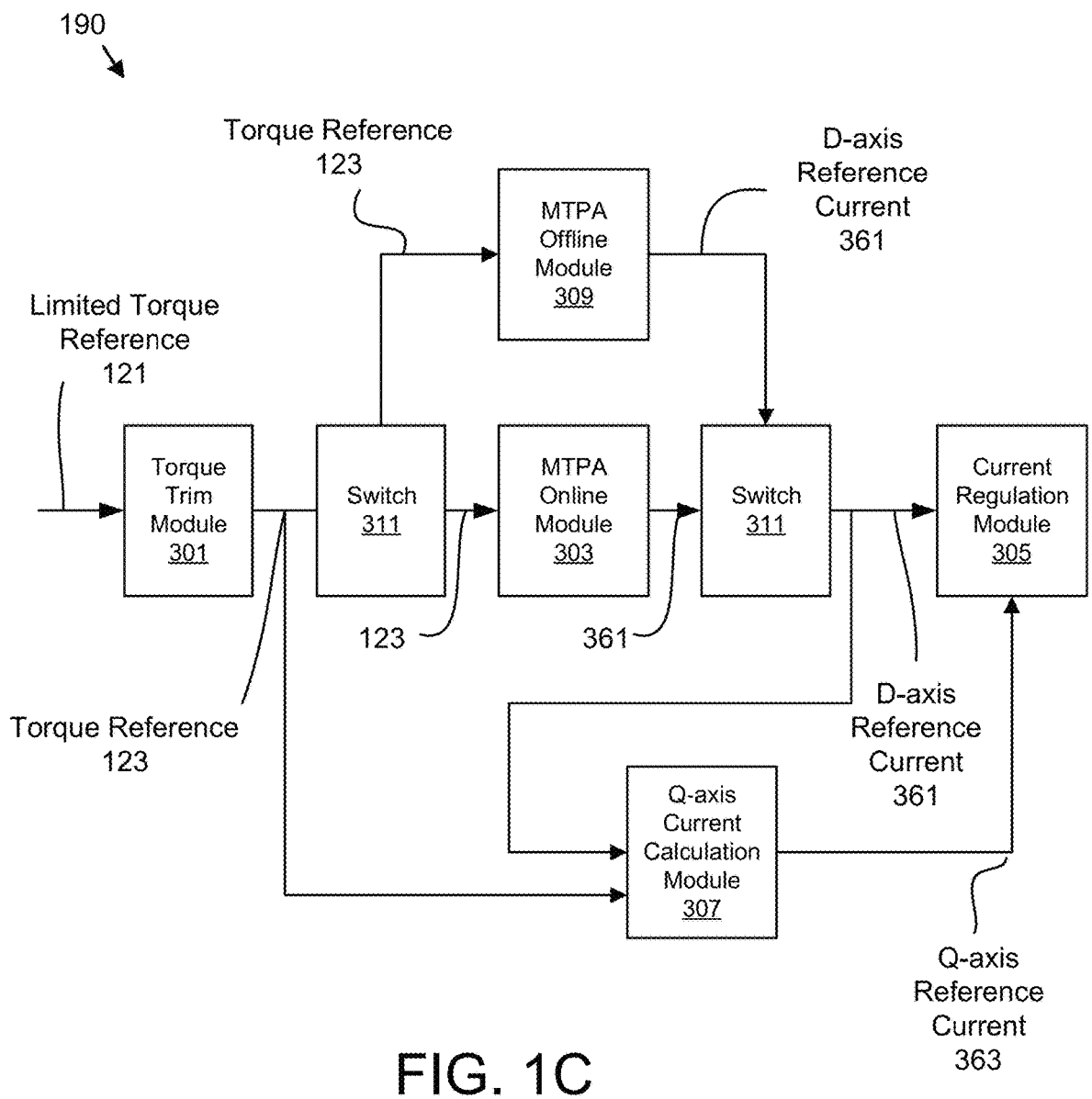
FIG. 1C is a schematic drawing of MTPA optimization according to an embodiment.

FIG. 1C is a schematic drawing of an MTPA optimization 190. The MTPA operation 190 generates the D-axis reference current 361 and Q-axis reference current 363 for a current regulation module 305 based on the limited torque reference 121. The MTPA operation 190 may be performed by a torque trim module 301, an MTPA online module 303, and a Q-axis current calculation module 307, an MTPA offline module 309, and switches 311. The torque trim module 301, MTPA online module 303, Q-axis current calculation module 307, current regulation module 305, MTPA offline module 309, and switches 311 are implemented as hardware, software, or combinations thereof. The torque trim module 301, MTPA online module 303, Q-axis current calculation module 307, current regulation module 305, MTPA offline module 309, and switches 311 may be embodied in the controller 150.

An MTPA offline process and an MTPA online process are both used to determine D-axis reference current 361 and the Q-axis reference current 363 11 for a specific torque reference 123. The switches 311 select between employing the MTPA offline module 309 and the MTPA offline process and the MTPA online module 303 and the MTPA online process. The MTPA offline module 309 is employed in the offline MTPA process such as an autotune operation, which is using the offline calculated MTPA curve to generate the D-axis reference current 361. The MTPA online module 303 is employed in the online MTPA process.

In both the MTPA offline process and the MTPA online process, the torque trim module 301 receives the limited torque reference 121 and generates a torque reference 123. The MTPA offline module 309 generates the D-axis reference current 361 and the axis reference current 363 based on the offline MTPA curve which is generated from an autotune operation as will be described hereafter.

The MTPA curve from the MTPA offline process is used to estimate a D-axis reference current 361 for the MTPA online process. The D-axis reference current 361 is further iteratively modified within a search zone. The Q-axis current calculation module 307 employs the torque reference 123 and the modified D-axis reference current 361 to modify a Q-axis reference current 363 to output the given torque specified by the limited torque reference 121.

The current regulation module 305 regulates the Q-axis current 111 and a D-axis current 113 for the given torque based on the modified D-axis reference current 361 and the modified Q-axis reference current 363 to generate the gate signals 169 and improve the efficiency of the motor 101 as will be described hereafter.

Figure 2A:
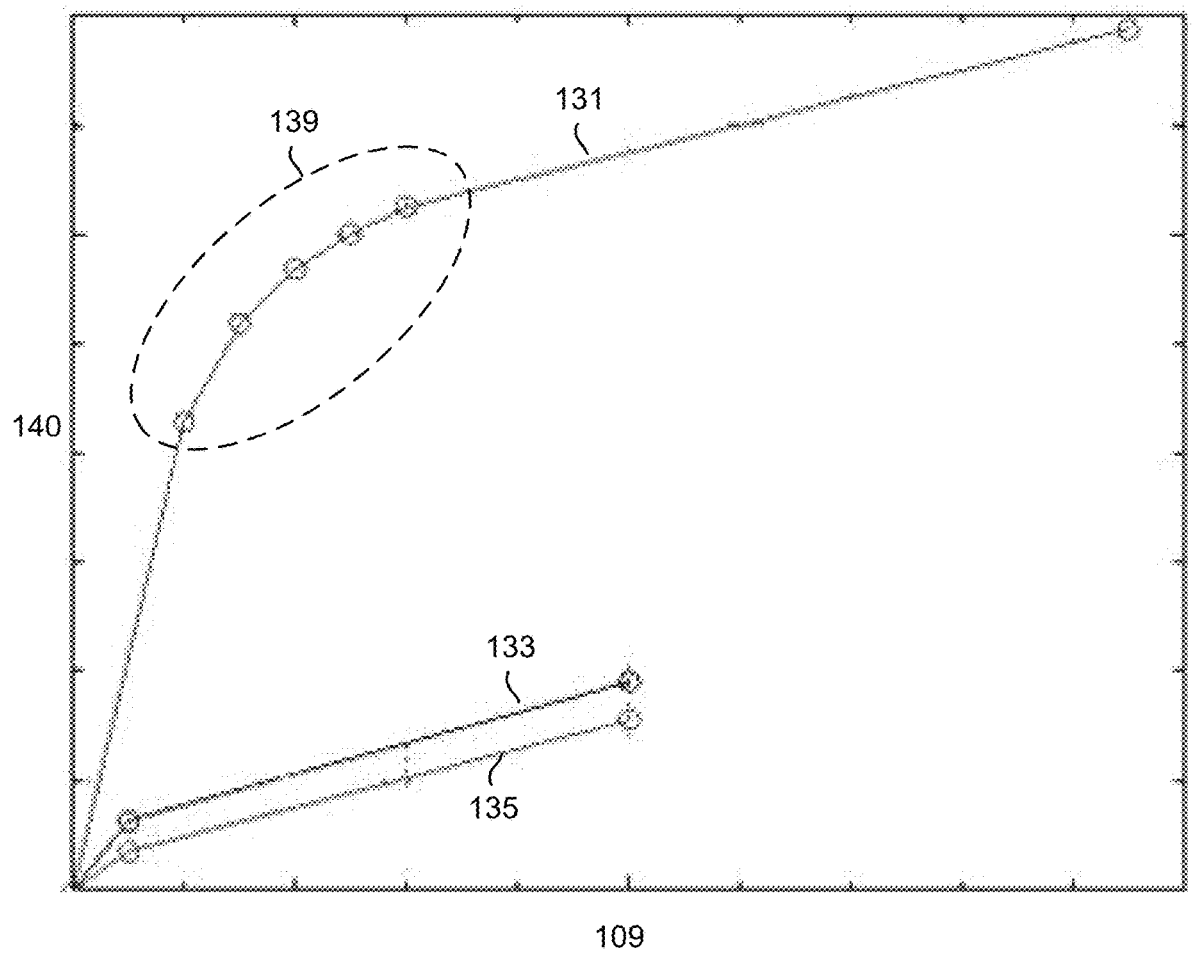
FIG. 2A is a graph of direct axis flux points captured in an autotune test according to an embodiment.

FIG. 2A is a graph of D-axis flux 140 captured in an autotune test. The D-axis flux 131, Q-axis flux 133, and Q-axis flux at D-axis current equals 100 percent 135 captured during the autotune test are shown. The D-axis flux 131 includes at least three critical D-axis flux points 139. The critical D-axis flux points 139 are used to generate D-axis flux 131 for Q-axis currents 111 of zero, 100 percent, and 200 percent to generate the offline MTPA curve as will be shown in FIG. 2B.

Figure 2B:
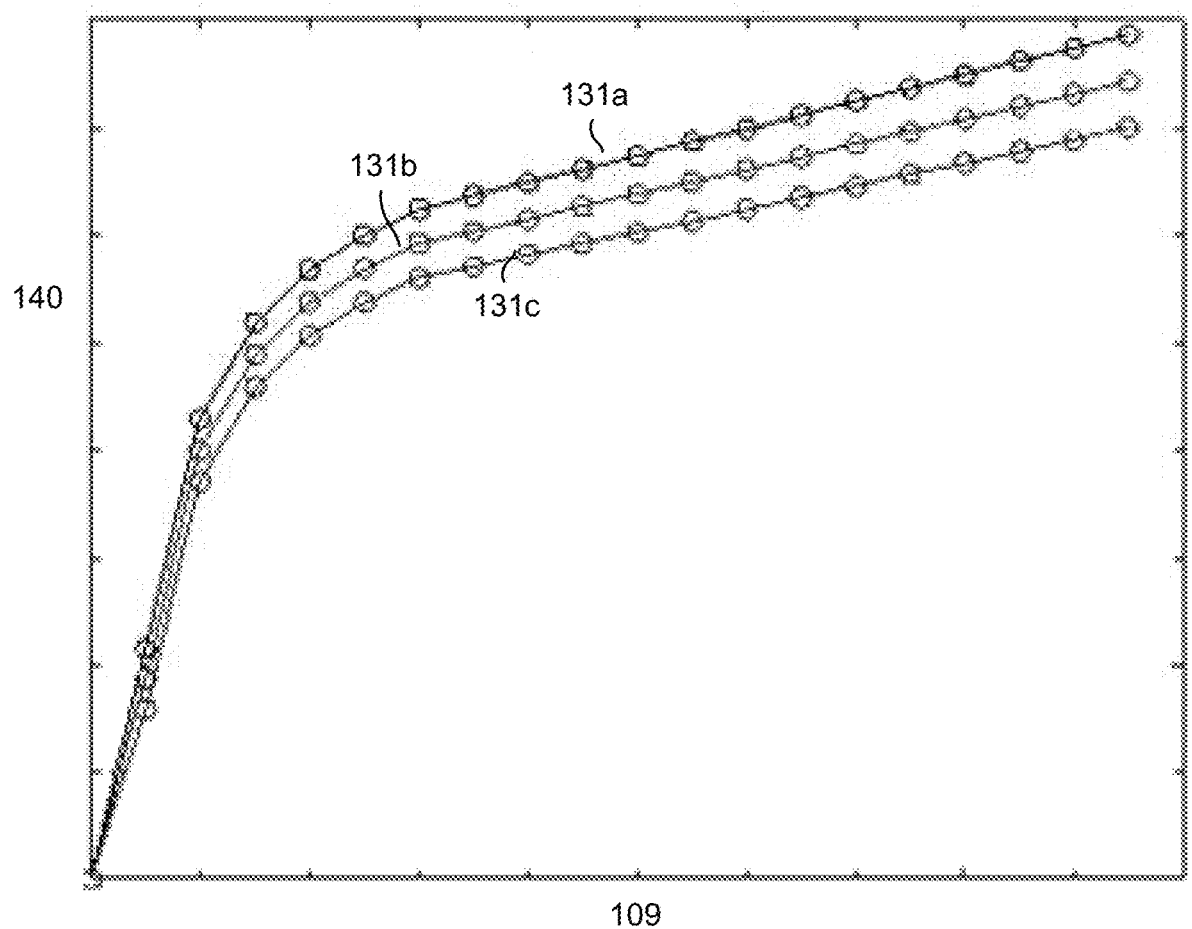
FIG. 2B is a graph of direct axis flux points after interpolation and extrapolation according to an embodiment.

FIG. 2B is a graph of D-axis flux 140 for Q-axis currents 111 of zero 131a, 100 percent 131b, and 200 percent 131c after interpolation and extrapolation of the D-axis flux 131 using the critical D-axis flux points 139.

Figure 2C:
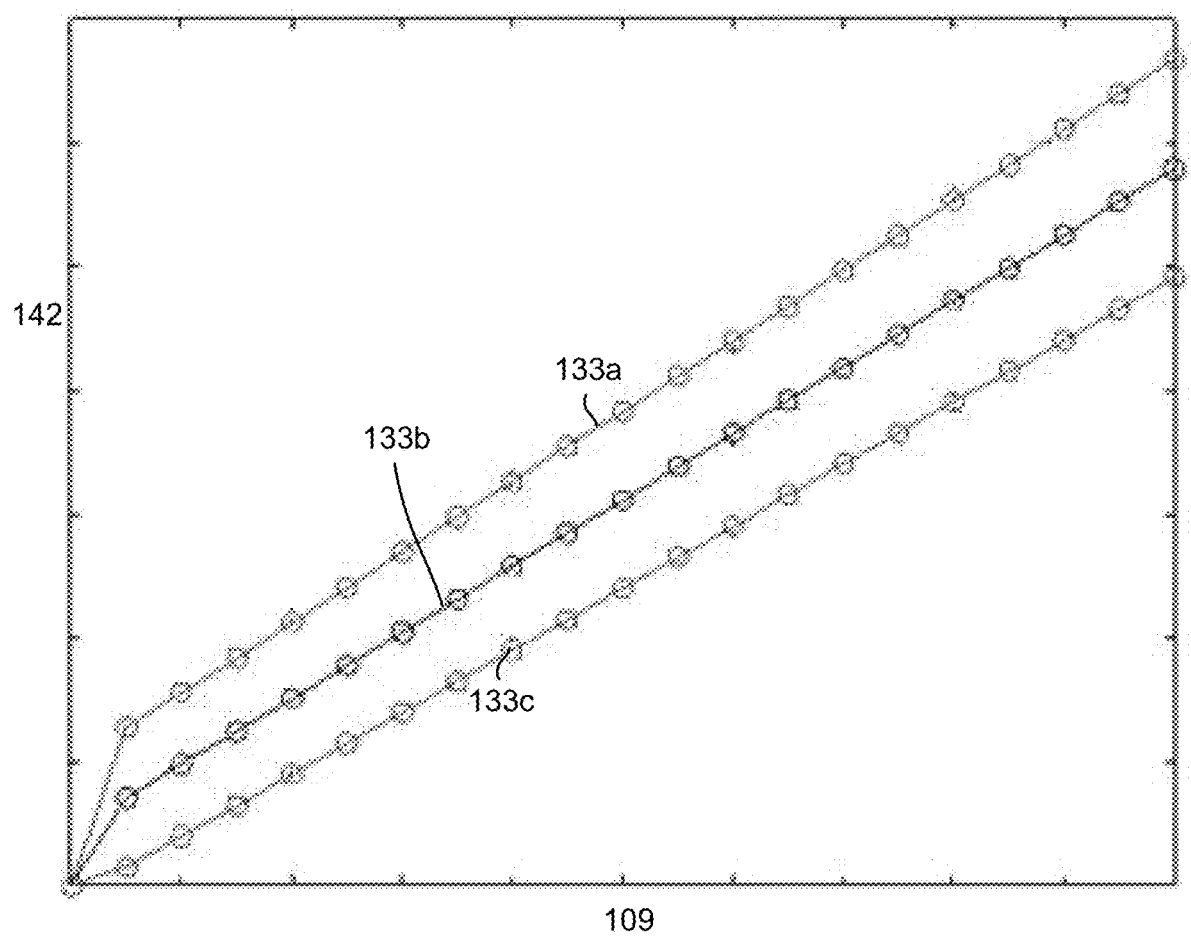
FIG. 2C is a graph of quadrature axis flux points after interpolation and extrapolation according to an embodiment.

FIG. 2C is a graph of Q-axis flux 142 for D-axis currents 113 zero 133a, 100 percent 133b, and 200 percent 133c after interpolation and extrapolation of the Q-axis flux 133 using the D-axis flux 131 of FIG. 2B.

Figure 2D:
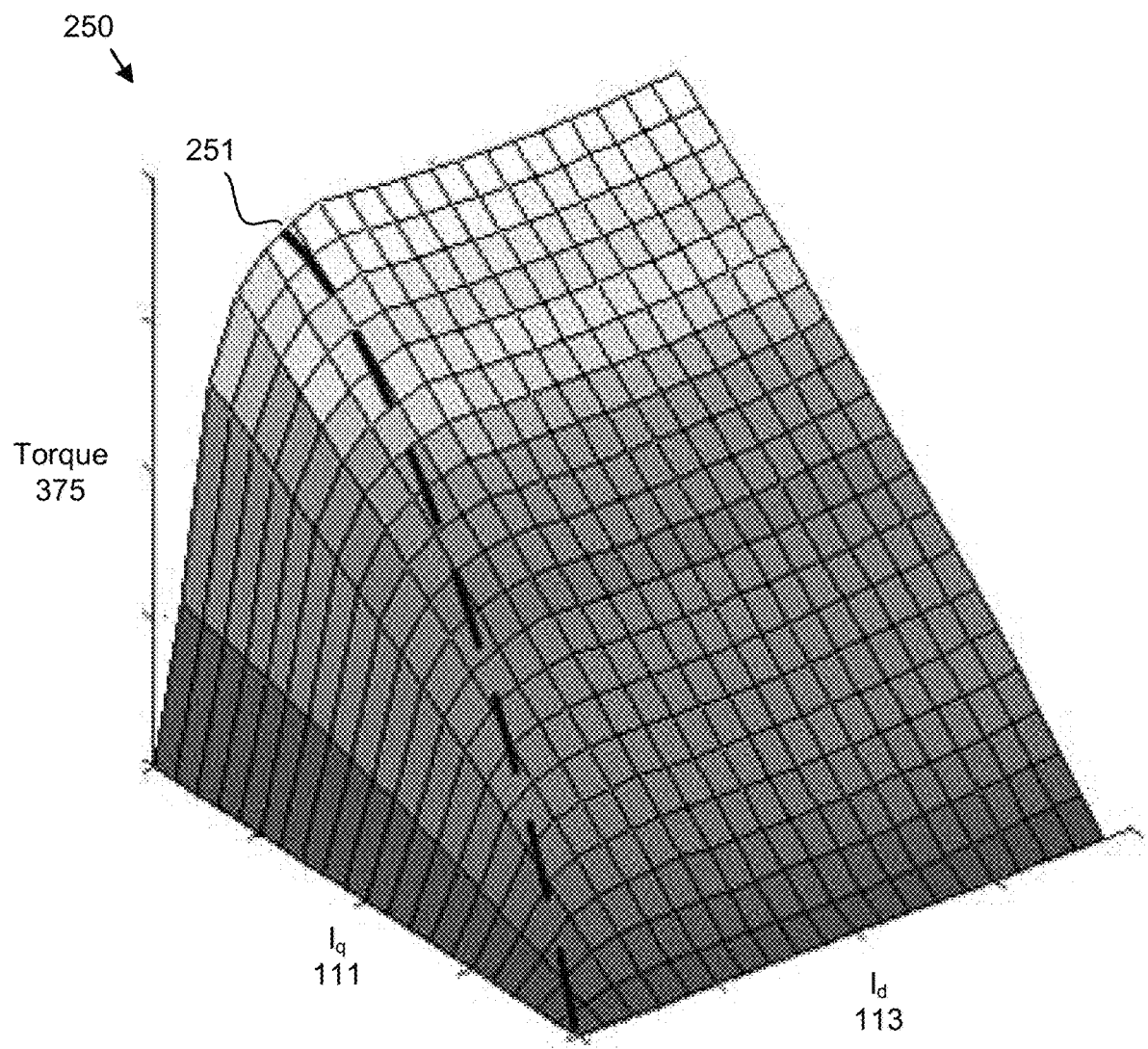
FIG. 2D is a three-dimensional graph of torque estimated for quadrature axis current and direct axis current according to an embodiment.

FIG. 2D is a three-dimensional graph 250 of torque 375 estimated for Q-axis current 111 and D-axis current 113 based on the D-axis flux $\varphi_d$ 131 and Q-axis flux $\varphi_q$ 133 of FIGS. 2B-C. The torque 375 is calculated as a function of the Q-axis current 111 and D-axis current 113. In one embodiment, the torque Trq 375 is calculated using Equation 1.

$$Trq = \varphi_d I_q - \varphi_q I_d \qquad \text{Equation 1}$$

In one embodiment, a search algorithm is applied to the graph 250 and/or the function of Equation 1 to identify the MTPA curve 251. The MTPA curve 251 may represent an estimated minimum current amplitude 109 for a given torque 375. In the past, the MTPA curve 251 from the autotune test was used to control the motor 101. The embodiments improve the MTPA curve 251 as will be described hereafter.

Figure 2E:
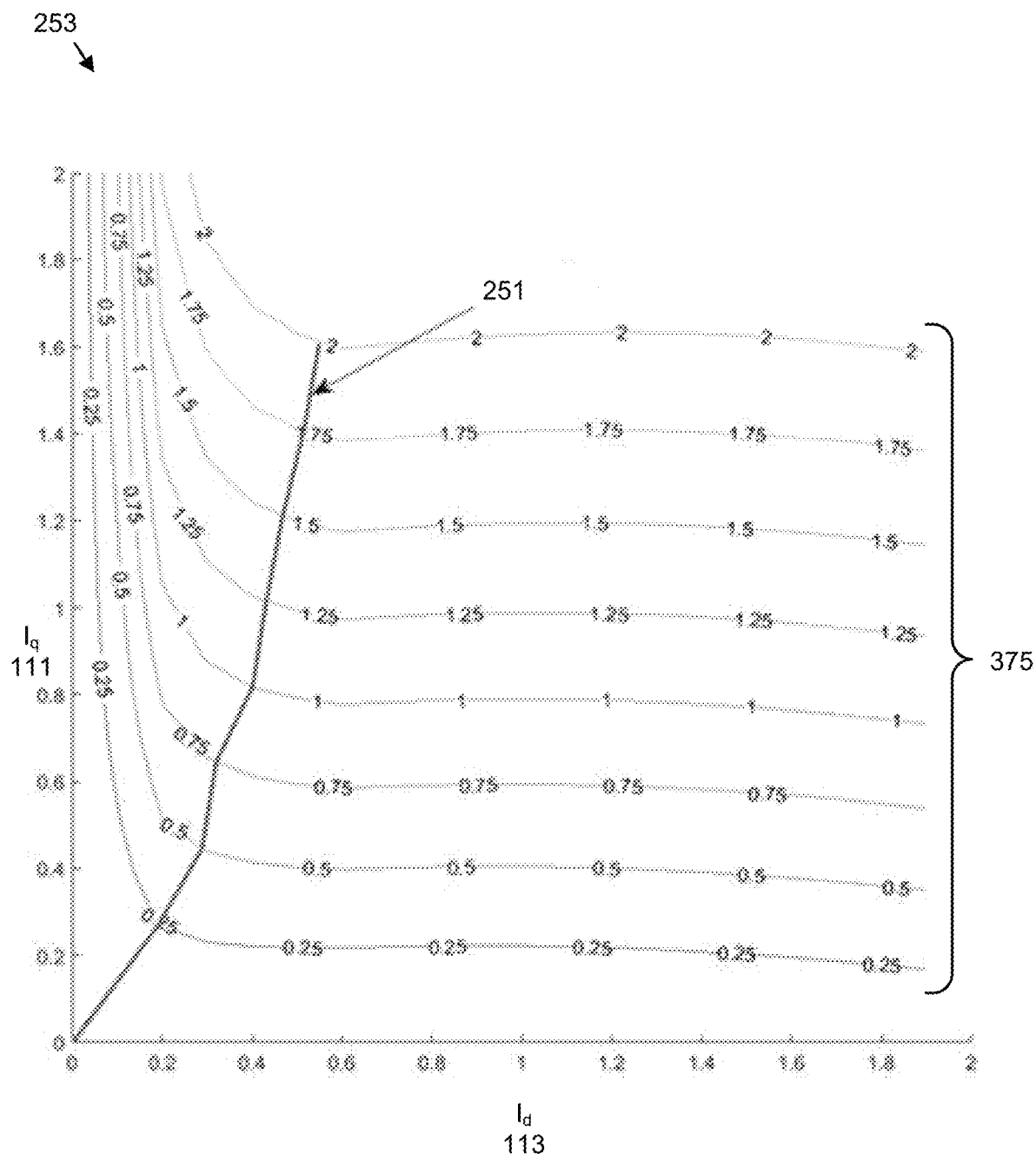
FIG. 2E is a graph of torque estimated for quadrature axis current and direct axis current according to an embodiment.

FIG. 2E is a graph 253 of torque 375 estimated for Q-axis currents 111 and D-axis currents 113. In one embodiment, torque 375 is calculated for a plurality of D-axis currents 113 and Q-axis currents 111. The torque 375 may be calculated using Equation 1. The search algorithm may identify the minimum current amplitude 109 for each torque 375 as the MTPA curve 251.

Figure 3A:
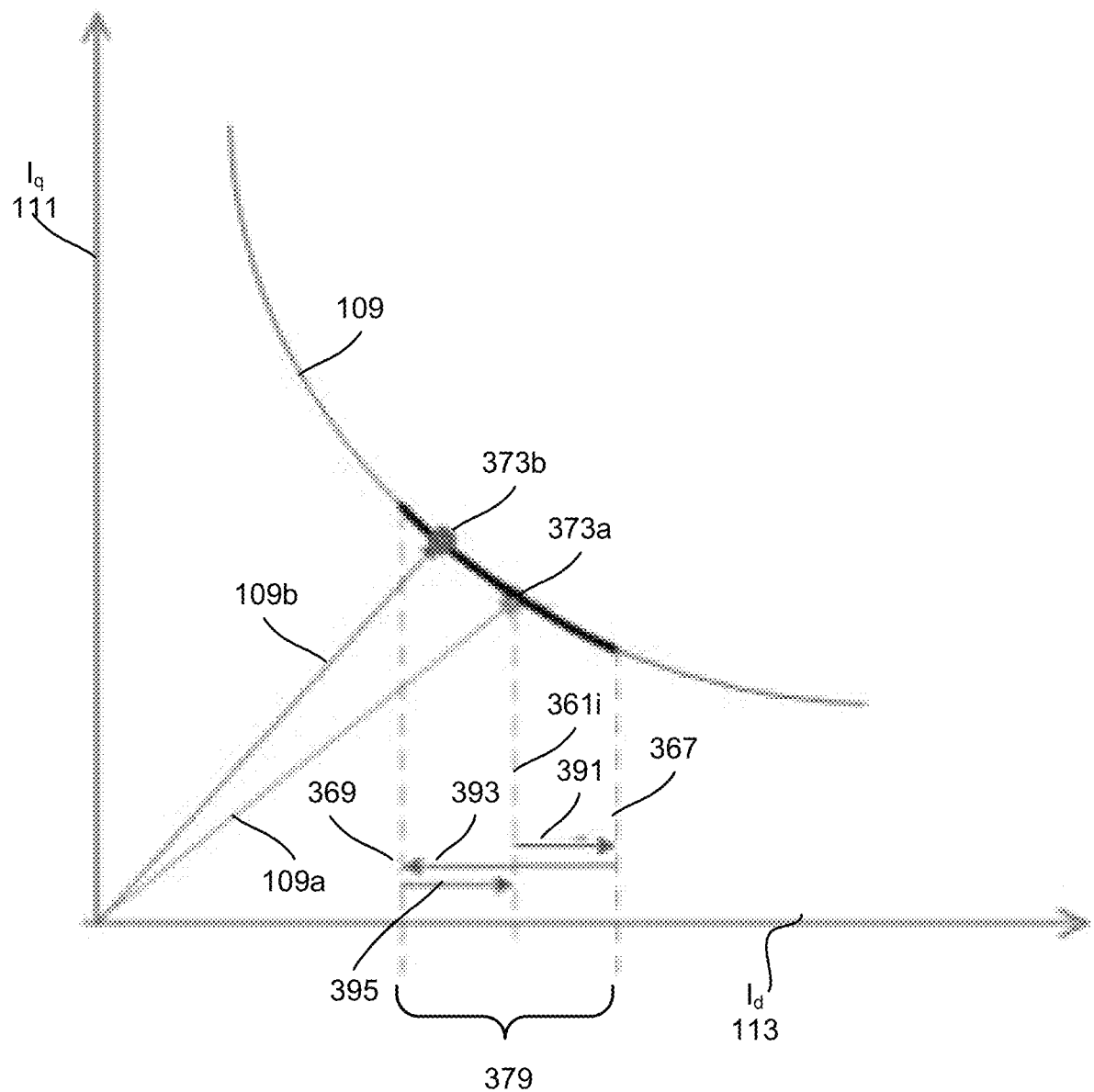
FIG. 3A is a graph of MTPA improvement or optimization according to an embodiment.

FIG. 3A is a graph of MTPA curve improvement or optimization. In the depicted embodiment, a curve of a given current amplitude 109 is shown as a function of a plurality of D-axis currents 113 and Q-axis currents 111. The current amplitude curve includes an initial torque point 373a. Each torque point 373 comprises a torque 375, a axis current 111, and a D-axis current 113. The initial torque point 373a is determined from the MTPA curve 251 for a given torque 375.

The embodiments may improve and/or optimize the MTPA curve 251 by generating a search zone 379 for the MTPA curve 251. The search zone 379 may be for a given torque point 373. The search zone 379 may be for a given torque 375. The search zone 379 may comprise an upper D-axis reference current 367 and a lower D-axis reference current 369 for the given torque point 373 and/or given torque 375. The upper D-axis reference current 367 and the lower D-axis reference current 369 may represent current limits beyond which a D-axis reference current 361 is not modified. The D-axis reference current 361 may be the D-axis current 113 as used to test improvements to the MTPA curve 251. The Q-axis reference current 363 may be the Q-axis current 111 as used to test improvements to test improvements to the MTPA curve 251.

The upper D-axis reference current 367 may be a first current limit and the lower D-axis reference current 369 may be a second current limit. Alternatively, the lower D-axis reference current 369 may be a first current limit and the upper D-axis reference current 367 may be a second current limit.

The D-axis reference current 361 may be iteratively modified by iteratively adding 391 a D-axis reference current step to an initial D-axis reference current 361i until the D-axis reference current 361 equals and/or exceeds a first current limit such as the upper D-axis reference current 367.

In addition, the D-axis reference current 361 may be iteratively modified 393 by iteratively subtracting the D-axis reference current step from the D-axis reference current 361 until the D-axis reference current 361 equals and/or exceeds a second current limit such as the lower D-axis reference current 369. The D-axis reference current 361 may be further iteratively modified 395 by iteratively adding the D-axis reference current step to the D-axis reference current 361 until the D-axis reference current 361 equals and/or exceeds the initial D-axis reference current 361i.

In one embodiment, the initial D-axis reference current 361i is equal to the D-axis current 113 for the given torque point 373 such as the torque point 373 for the MTPA curve 251. In an alternative embodiment, the initial D-axis reference current 361i is set equal to the second current limit and the D-axis reference current 361 is iteratively modified by iteratively adding the D-axis reference current step to the initial D-axis reference current 361i until the D-axis reference current 361 exceeds the first current limit.

The D-axis reference current step may be in the range of 5 percent to 20 percent of the search zone 379. For example, if the search zone 379 is 0.2 amps, the D-axis reference current step may be in the range of 0.01 amps to 0.04 amps. The D-axis reference current step may be negative.

In a certain embodiment, the D-axis reference current step is 20 percent of the search zone 379. The D-axis reference current 361 may be iteratively modified to the lower D-axis reference 369 plus one times the D-axis reference current step, two times the D-axis reference current step, and three times the D-axis reference current step. A new upper D-axis reference current 367 and lower D-axis reference 369 may be iteratively set to the modified D-axis reference current 361 and the modified Q-axis reference current 363 with a lowest current amplitude 109 plus and minus the D-axis reference current step respectively. The D-axis reference current 361 may be again iteratively modified using the new upper D-axis reference current 367 and new lower D-axis reference current 369. In one embodiment, 2-4 iterations of upper D-axis reference current 367 and lower D-axis reference current 369 are tested.

Figure 3B:
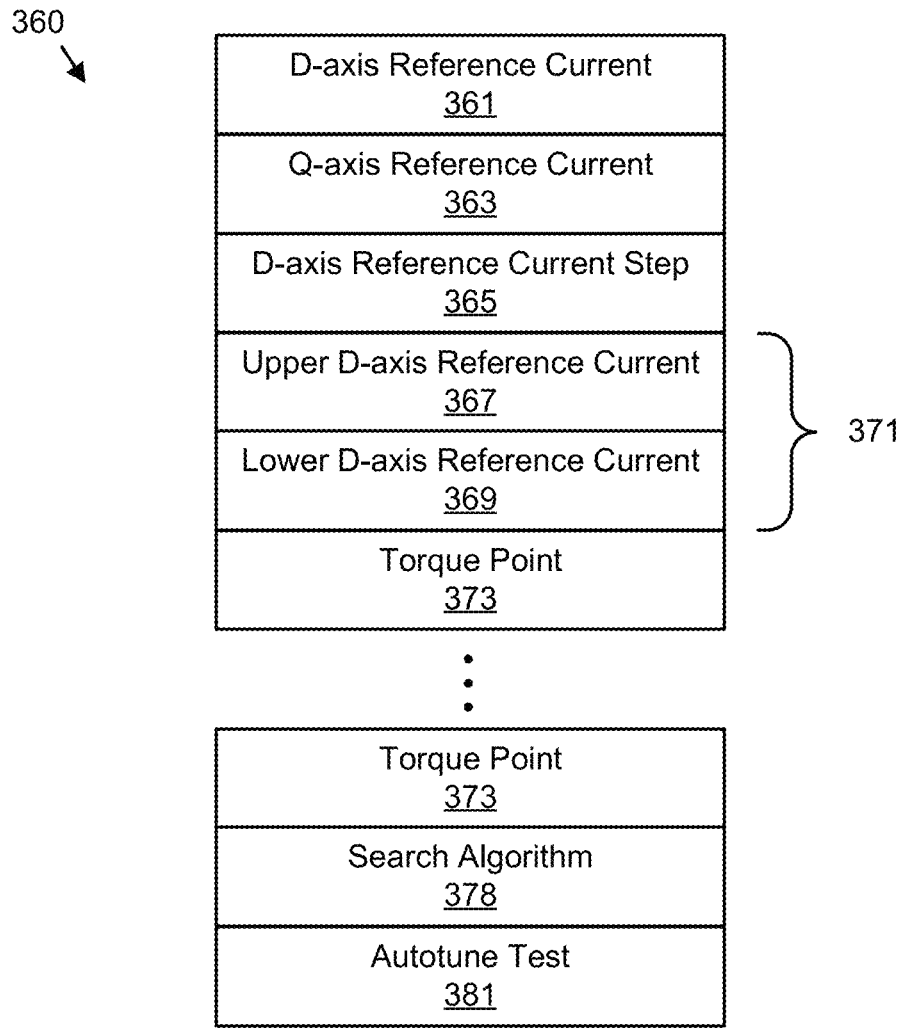
FIG. 3B is a schematic block diagram of MTPA data according to an embodiment.

FIG. 3B is a schematic block diagram of MTPA data 360. The MTPA data 360 may be used to improve the MTPA curve 251. The MTPA data 360 may be organized as a data structure in a memory. In the depicted embodiment, the MTPA data 360 includes the D-axis reference current 361, the Q-axis reference current 363, the D-axis reference current step 365, the upper D-axis reference current 367, the lower D-axis reference current 369, a plurality of torque points 373, the search algorithm 378, and the autotune test 381. The upper D-axis reference current 367 and the lower D-axis reference current 369 may comprise the current limits 371.

Figure 3C:
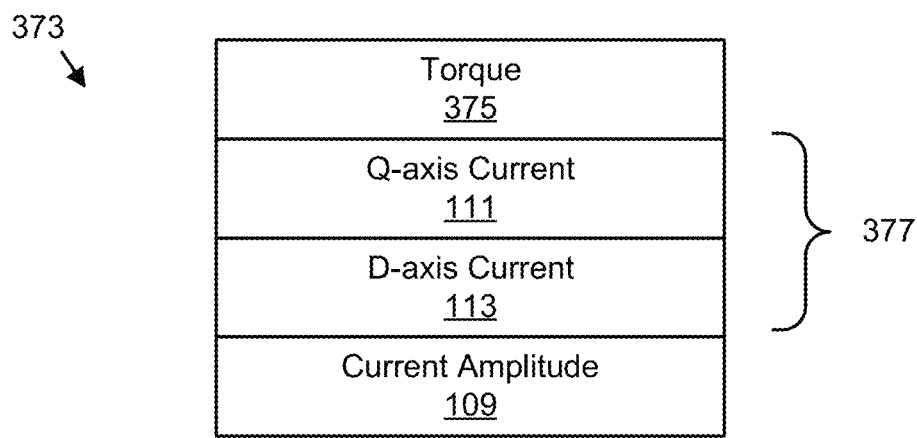
FIG. 3C is a schematic block diagram of a torque point according to an embodiment.

FIG. 3C is a schematic block diagram of the torque point 373 of FIG. 3B. In the depicted embodiment, the torque point 373 comprises of torque 375 and a current pair 377. The current pair 377 comprises a Q-axis current 111 and a D-axis current 113. In one embodiment, the torque point 373 includes a current amplitude 109 corresponding to the Q-axis current 111 and the D-axis current 113.

FIG. 4 is a schematic block diagram of the controller 150. The controller 150 may be a computer. In the depicted embodiment, the controller 150 includes a processor 405, a memory 410, and communication hardware 415. The memory 410 may store code and data. The processor 405 may execute the code and process the data. The communication hardware 415 may communicate with other devices such as the inverter 165 via the gate signals 169, the limited torque reference 121, and the like.

Figure 5A:
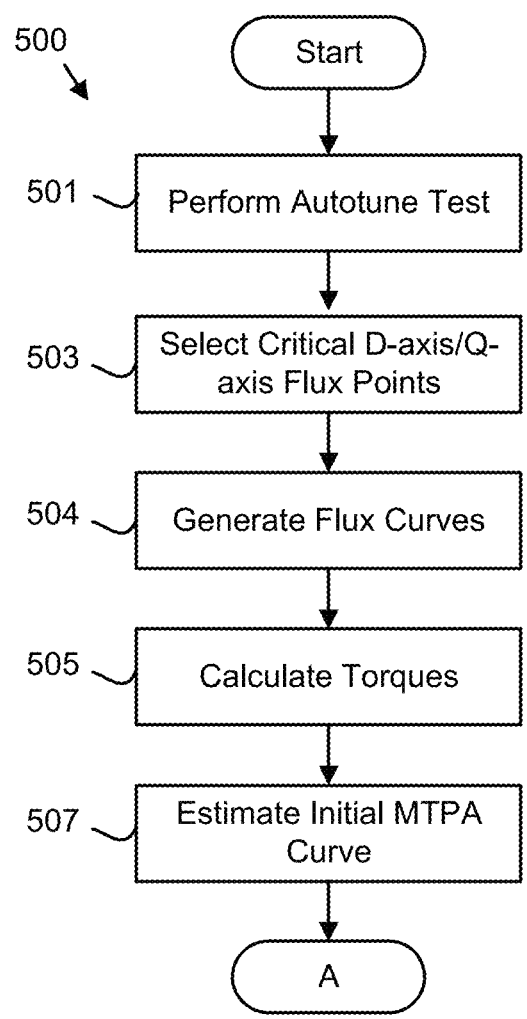
FIGS. 5A-C are schematic flow chart diagram of an MTPA update and/or optimization method according to an embodiment.
Figure 5B:
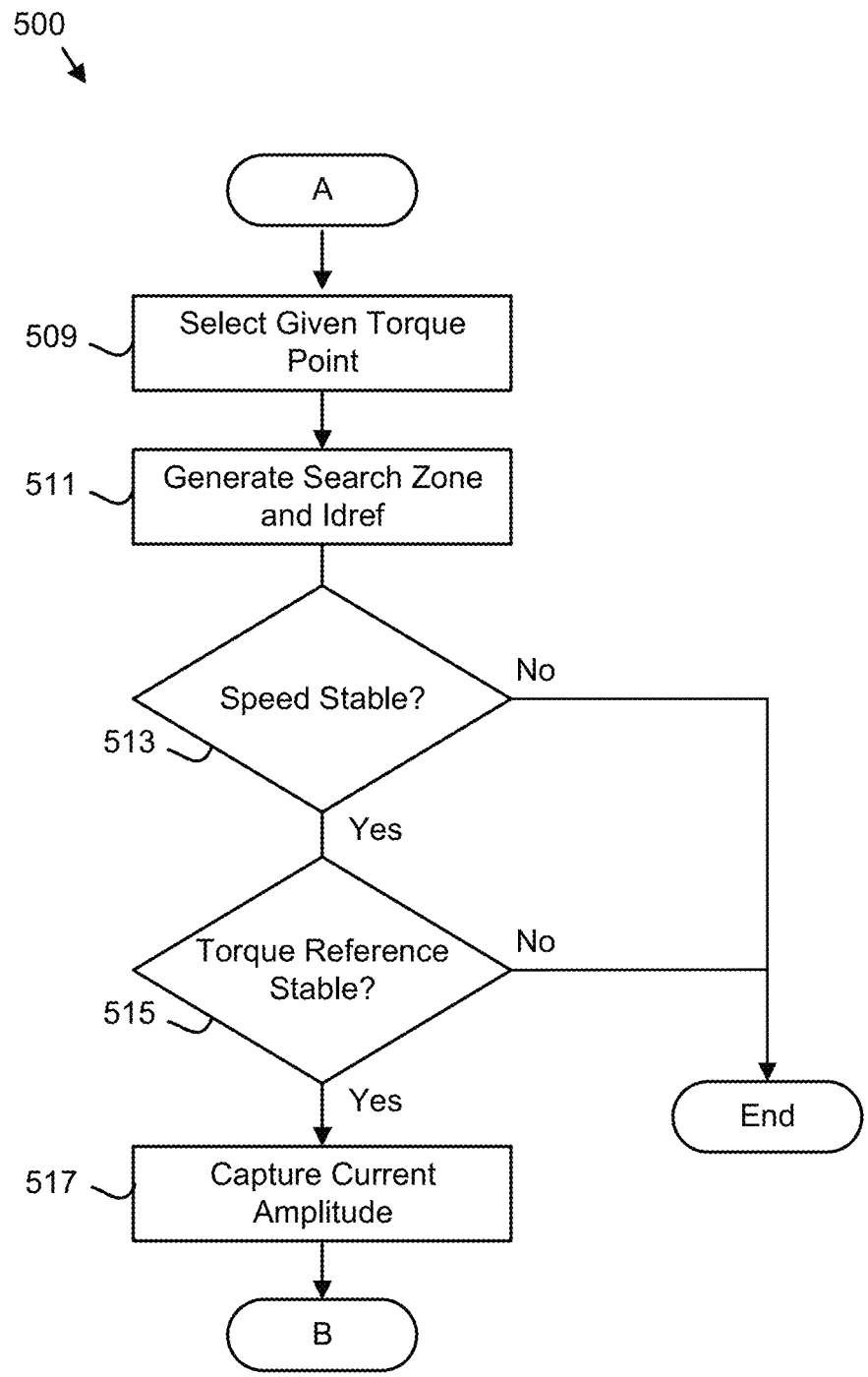
Figure 5C:
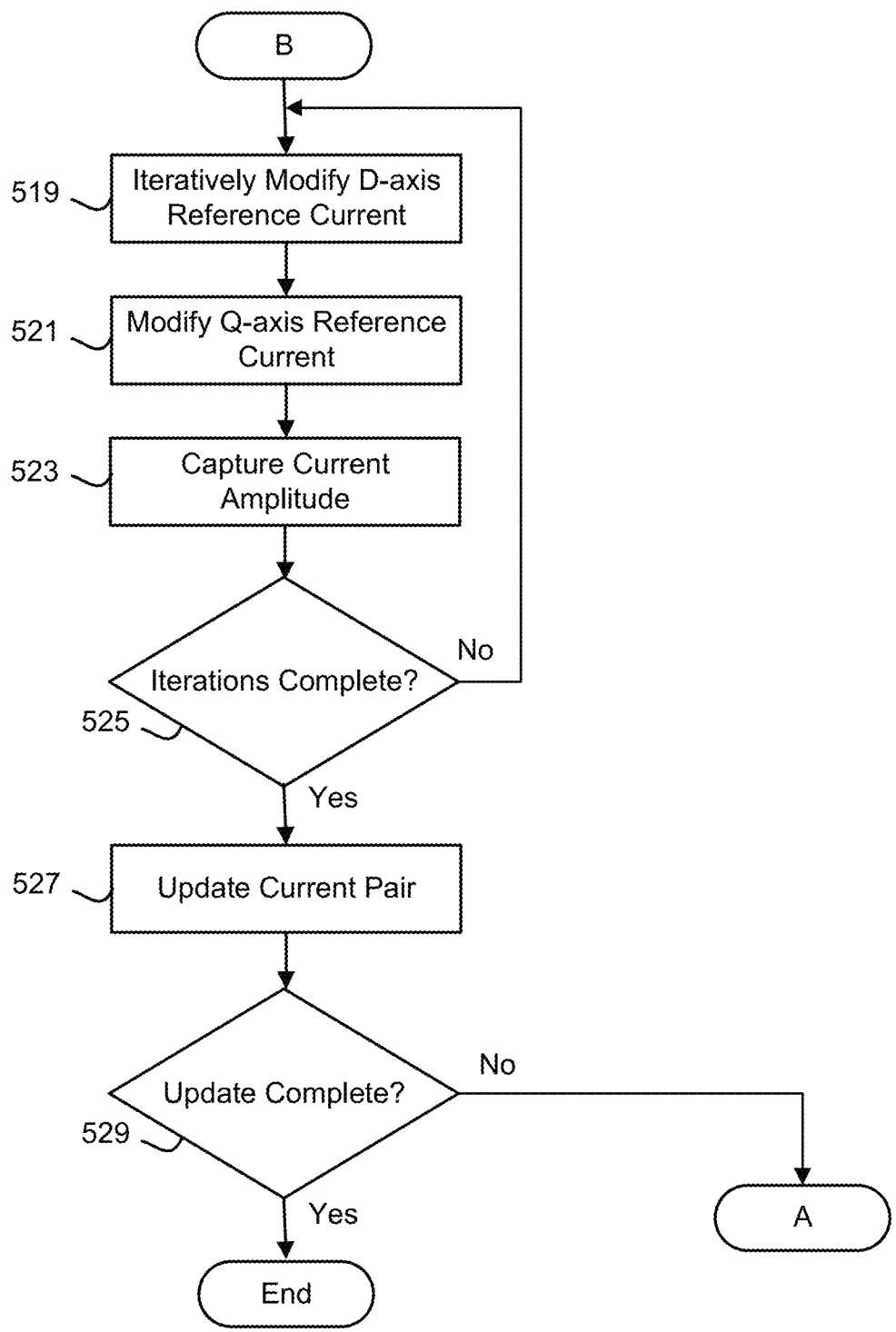

FIGS. 5A-C are a schematic flow chart diagram of an MTPA update and/or optimization method 500. The MTPA update method 500 may generate an offline MTPA curve 251 and update at least one torque point 373 for the MTPA curve 251. The method 500 may be performed by the controller 150.

The method 500 starts, and in one embodiment, the controller 150 performs 501 the autotune test 381 on the motor 101. The autotune test 381 may calculate the D-axis flux 131 and the Q-axis flux 133 as shown in FIG. 2A.

The controller 150 may further select 503 at least three critical D-axis flux points 139 in a knee portion on D-axis flux curve 131 as shown in FIG. 2A. in addition, the controller 150 may generate 504 the D-axis flux 131 and the Q-axis flux 133 such as is shown in FIGS. 2B and 2C respectively.

The controller 150 may calculate 505 the torques 375 for a plurality of torque points 373 as a function of the corresponding D-axis currents 113 and Q-axis currents 111. The torques 375 may be calculated using Equation 1. The controller 150 may estimate 507 the initial MTPA curve 251. The initial MTPA curve 251 may be estimated 507 based on the plurality of torque points 373. In one embodiment, the controller 105 calculates the plurality of torque points 373 as illustrated in FIG. 2D and employs the search algorithm 378 to identify the minimum current amplitude 109 for each given torque 375 as the initial MTPA curve 251 as shown in FIG. 2E.

In one embodiment, the controller 150 selects 509 a given torque point 373 on the MTPA curve 251. The given torque point 373 may be selected 509 to be updated. The method 500 may select 509 at least two torque points 373 to be updated. In a certain embodiment, the method selects 509 each torque point 373 to be updated.

The controller generates 511 a search zone 379 for the MTPA curve 251 for the given torque point 373. The search zone 379 comprises an upper D-axis reference current 367 and a lower D-axis reference current 369 for the given torque point 373. In addition, the controller may generate 511 a D-axis reference current 361 or an initial D-axis reference current 361i such as is shown in FIG. 3A.

In one embodiment, the controller 150 determines 513 whether an angular velocity of the motor 101 is stable. The angular velocity may be stable if the angular velocity does not vary by more than 2 percent. If the angular velocity is not stable, the method 500 ends. If the angular velocity is stable, the controller 150 determines 515 whether the torque reference 123 is stable. The torque reference 123 may be stable if the torque reference 123 does not vary by more than 2 percent. If the torque reference 123 is not stable, the method 500 ends.

If the torque reference 123 is stable, the controller 150 captures the current amplitude 109 for the D-axis reference current 361. The controller 150 further iteratively modifies 519 the D-axis reference current 361 between the upper D-axis reference current 367 and the lower D-axis reference current 369 of the search zone 379. For example, the controller 150 may modify 519 the D-axis reference current 361 by adding and/or subtracting the D-axis reference current step 365.

The controller 150 modifies 521 the Q-axis reference current 363 to output the given torque 375 of the torque point 373 and captures 523 the current amplitude 109. The controller 150 iteratively modifies the D-axis reference current 361 until the determining 525 that iterations are complete. Iterations may be complete when a specified number of D-axis reference currents 361 are tested at least once.

The controller 150 updates 527 the corresponding current pair 377 of the given torque point 373 to the modified D-axis reference current 361 and modified Q-axis reference current 363 with a lowest current amplitude 109. For example, the Q-axis current 111 of the torque point 373 is set to the modified Q-axis reference current 363 with the lowest current amplitude 109 and the D-axis current 113 of the torque point 373 is set to the corresponding modified D-axis reference current 361. As a result, the MTPA curve 251 is updated, improving the efficiency of the motor 101.

The controller 150 determines 529 if the update to the MTPA curve 251 is complete. The update may be complete if all desired torque points 373 are updated. If the update is not complete, the controller 150 selects 509 a new given torque point 373. If the update is complete, the method 500 ends.

Figure 6A:
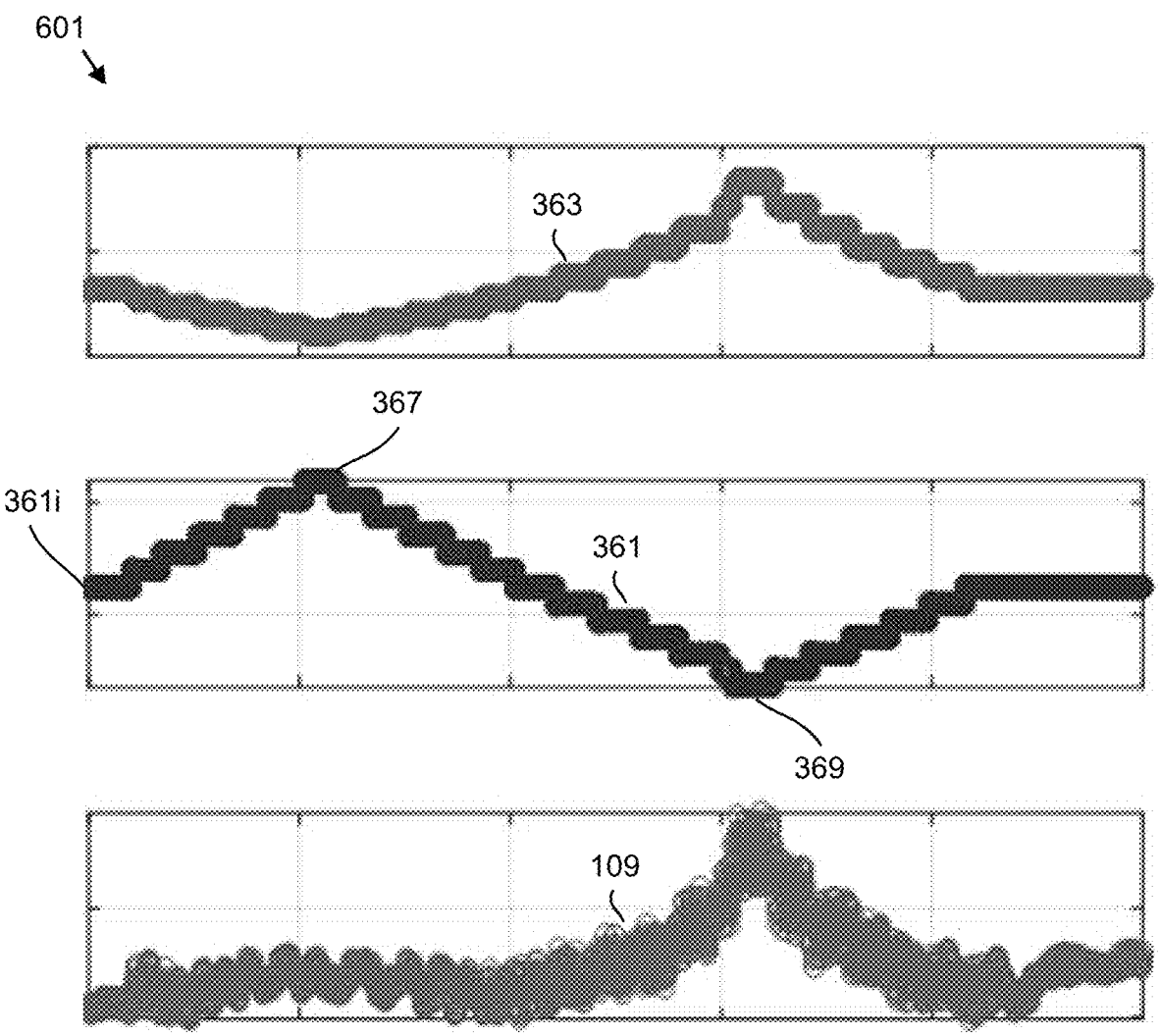
FIG. 6A are graphs of an online MTPA searching method according to an embodiment.

FIG. 6A are graphs 601 illustrating the MTPA searching and/or optimization method 500. In the depicted example, the D-axis reference current 361 for a given torque point 373 is set to an initial D-axis reference current 361i at time zero. The D-axis reference current 361 is iteratively modified by adding the D-axis reference current step 365 until the D-axis reference current 361 is equal to the upper D-axis reference current 367. The D-axis reference current 361 is further iteratively modified by subtracting the D-axis reference current step 365 until the D-axis reference current 361 is equal to the lower D-axis reference current 369. The D-axis reference current 361 is iteratively modified by adding the D-axis reference current step 365 until the D-axis reference current 361 is equal to the initial D-axis reference current 361i.

With each modification to the D-axis reference current 361, the Q-axis reference current 363 is modified to output the given torque 375 for the torque point 373. The current amplitude 309 is captured for each modified D-axis reference current 361 and modified Q-axis reference current 363 current pair 377. The current pair 377 with the lowest current amplitude 109 is used to update the MTPA curve 251 at the given torque point 373.

Figure 6B:
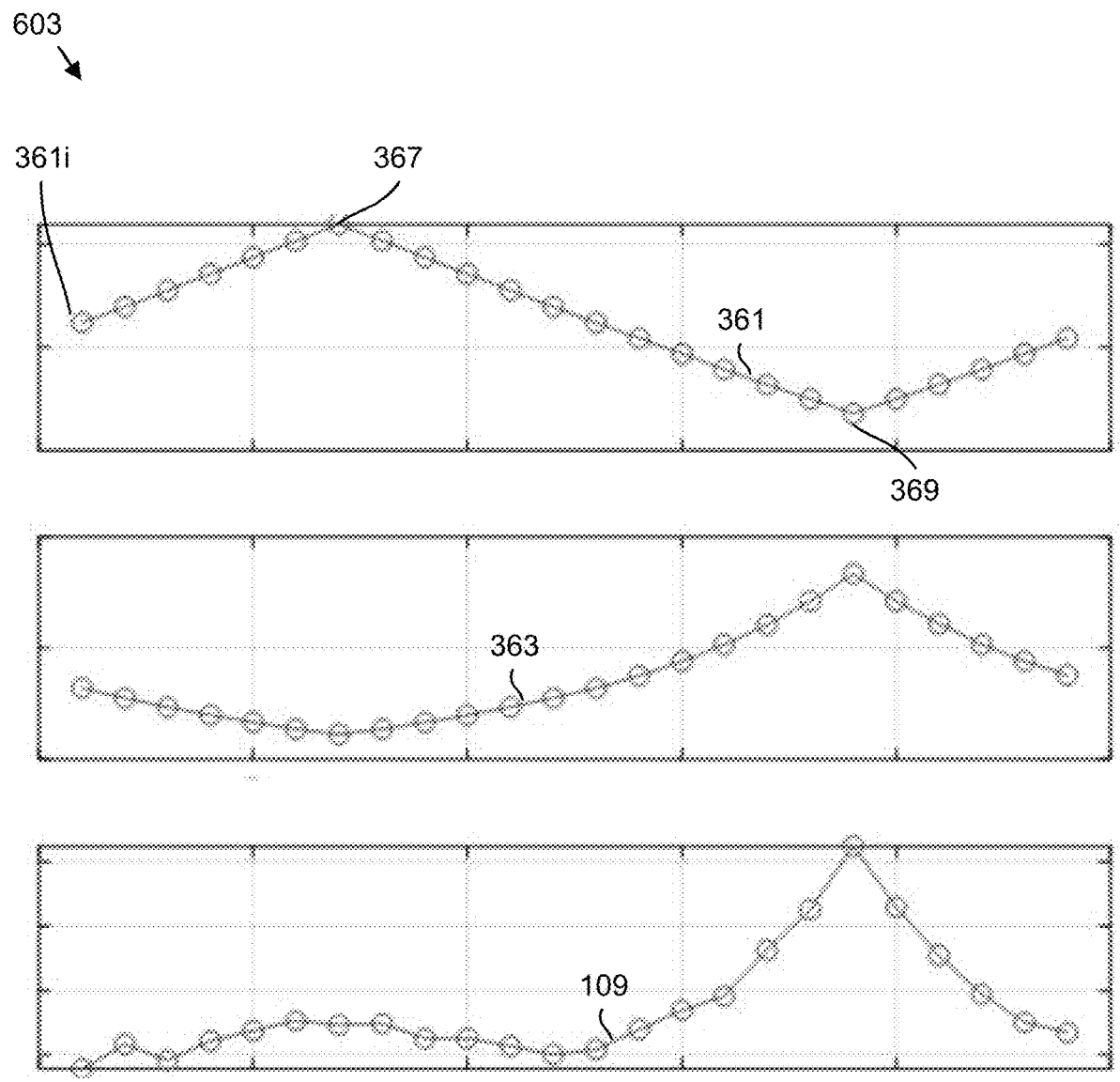
FIG. 6B are graphs of an online MTPA searching method according to an embodiment.

FIG. 6B are graphs 603 illustrating the MTPA searching and/or optimization method 500. In the depicted example, the D-axis reference current 361 for a given torque 375 is set to an initial D-axis reference current 361i at an initial time. The D-axis reference current 361 is iteratively modified by adding the D-axis reference current step 365 until the D-axis reference current 361 is equal to the upper D-axis reference current 367. The D-axis reference current 361 is further iteratively modified by subtracting the D-axis reference current step 365 until the D-axis reference current 361 is equal to the lower D-axis reference current 369. The D-axis reference current 361 is iteratively modified by adding the D-axis reference current step 365 until the D-axis reference current 361 is equal to the initial D-axis reference current 361i.

With each modification to the D-axis reference current 361, the Q-axis reference current 363 is modified to output the given torque 375. The current amplitude 309 is captured for each modified D-axis reference current 361 and modified Q-axis reference current 363 current pair 377. The current pair 377 with lowest current amplitude 109 is used to update the MTPA curve 251 for the given torque 375.

Figure 6C:
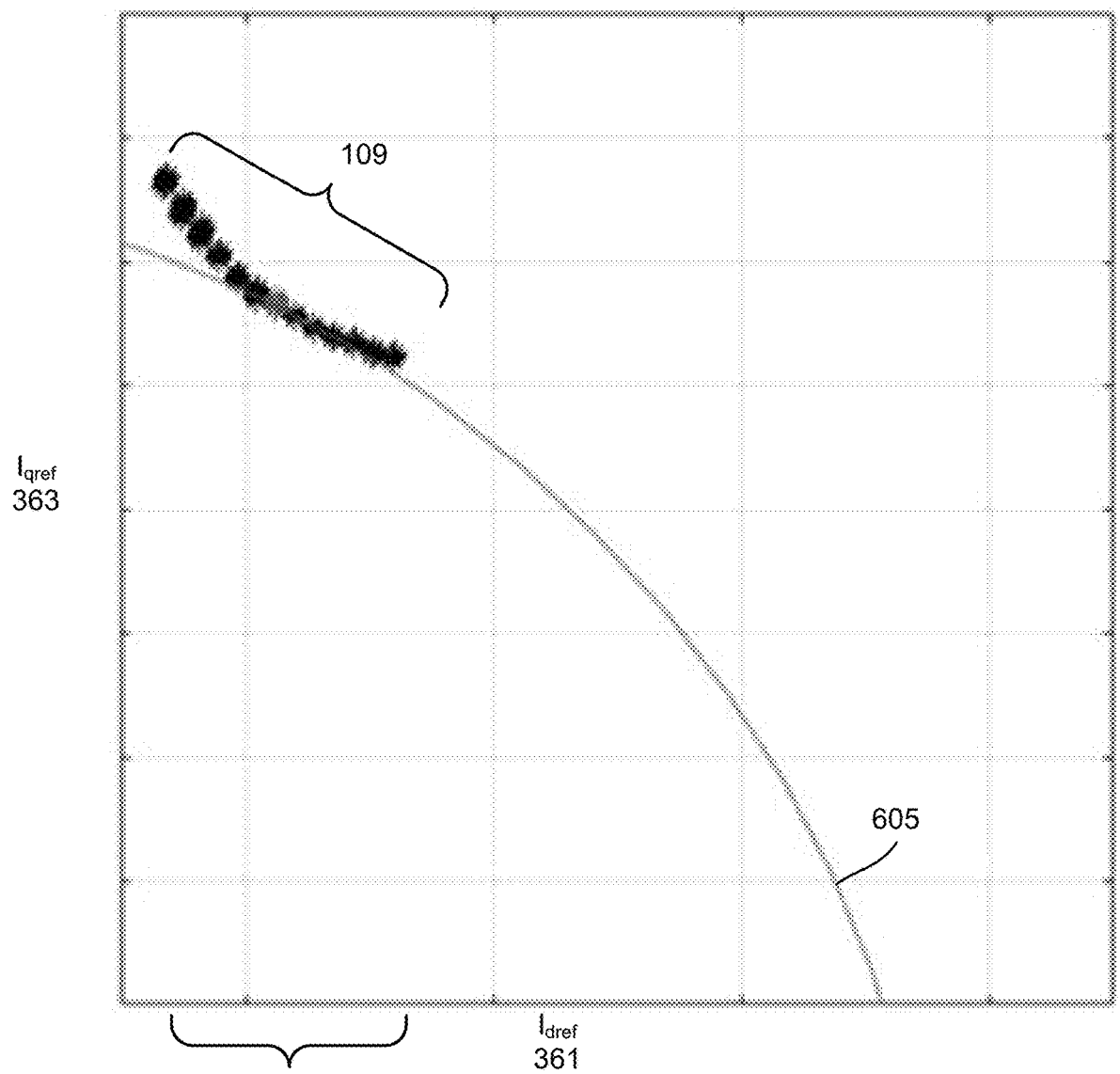
FIG. 6C is a graph of the direct axis reference current and quadrature axis reference current for an MTPA searching method according to an embodiment.

FIG. 6C is a graph of the D-axis reference current 361 and Q-axis reference current 363 for the MTPA searching and/or optimization method 500. In the depicted embodiment, the current amplitude 109 is captured for a plurality of modified D-axis reference current 361 and corresponding modified Q-axis reference current 363 current pairs 377 within a search zone 379. A minimum current amplitude curve 605 is shown.

Figure 6D:
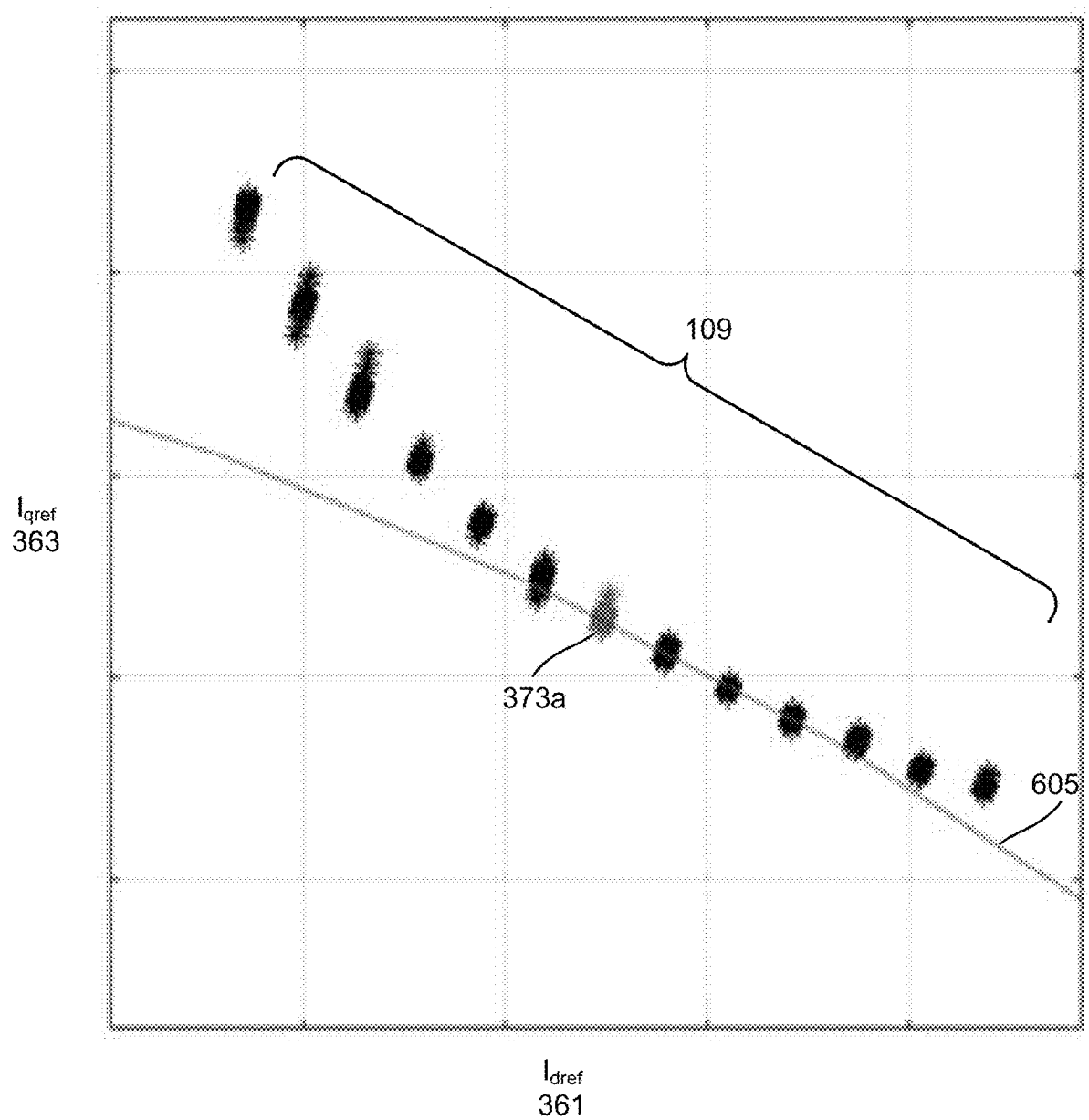
FIG. 6D is a graph of the direct axis reference current and quadrature axis reference current for an MTPA searching method according to an embodiment.

FIG. 6D is a closeup graph of the D-axis reference current 361 and Q-axis reference current 363 for the MTPA searching and/or optimization method 500 of FIG. 6C. In the depicted embodiment, the current pair 373a with the minimum current amplitude 109 is selected to update the MTPA curve 251. Thus, the MTPA curve 251 is updated with the modified D-axis reference current 361 and the modified Q-axis reference current 363 of the indicated current pair 377a.

Problem/Solution

In the past, offline MTPA curves 251 have been generated to provide input in controlling motors 101. The offline MTPA curves 251 are often generated by an autotune test 381. Unfortunately, the offline MTPA curves 251 often have inaccuracies that result in less efficient motor operation.

The embodiments generate the offline MTPA curve 251 with a plurality of torque points 373. The embodiments further update the current pairs 377 of the MTPA curve 251 with a modified D-axis reference current 361 and a modified Q-axis reference current 363 within a search zone 379. The embodiments select the current pair 377 with the lowest current amplitude 109 to update the MTPA curve 251. As a result, the MTPA curve 251 more accurately reflects the operation of the motor 101, allowing the controller 150 to more efficiently operate the motor 101.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
generating an offline Maximum Torque Per Amps (MTPA) curve based on an autotune test for a motor;
generating a search zone for the MTPA curve for a given torque point, the search zone comprising an upper D-axis reference current and a lower D-axis reference current for the given torque point, wherein the MTPA curve comprises torque points of torques for current pairs of a Q-axis current and a D-axis current for the motor;
iteratively modifying a D-axis reference current between the upper D-axis reference current and the lower D-axis reference current of the search zone;
modifying a Q-axis reference current to output the given torque; and
updating a corresponding current pair of the given torque point to the modified D-axis reference current and the modified Q-axis reference current with a lowest current amplitude to further improve the efficiency of the motor.

2. The method of claim 1, wherein the upper D-axis reference current and the lower D-axis reference are current limits and the D-axis reference current is iteratively modified by iteratively adding a D-axis reference current step to an initial D-axis reference current until the D-axis reference current exceeds a first current limit, iteratively subtracting the D-axis reference current step from the D-axis reference current until the D-axis reference current exceeds a second current limit, and iteratively adding the D-axis reference current step to the D-axis reference current until the D-axis reference current equals the initial D-axis reference current.

3. The method of claim 2, wherein the initial D-axis reference current is equal to the D-axis reference current for the given torque point.

4. The method of claim 2, wherein the D-axis reference current step is in the range of 5 percent to 20 percent of the search zone.

5. The method of claim 1, wherein the upper D-axis reference current and the lower D-axis reference are current limits and the D-axis reference current is iteratively modified by iteratively adding a D-axis reference current step to an initial D-axis reference current that is equal to a second current limit until the D-axis reference current exceeds a first current limit.

6. The method of claim 1, wherein the D-axis reference current, the D-axis reference current step is 20 percent of the search zone, and the D-axis reference current is iteratively modified to the lower D-axis reference plus one times the D-axis reference current step, two times the D-axis reference current step, and three times the D-axis reference current step, and a new upper D-axis reference current and lower D-axis reference are iteratively set to the modified D-axis reference current and modified Q-axis reference current with a lowest current amplitude plus and minus the D-axis reference current step respectively.

7. The method of claim 1, the method further comprising:
performing the autotune test on the motor;
selecting at least three critical D-axis flux points in a knee portion on D-axis flux curve;
calculating torques as a function of D-axis current and Q-axis current;
estimating the initial MTPA curve;
determining whether an angular velocity of the motor is stable; and
determining whether a torque reference is stable.

8. The method of claim 1, wherein the autotune test is a default operation.

9. The method of claim 1, wherein the motor is a synchronous machine.

10. An apparatus comprising:
a controller that performs:
generating an offline Maximum Torque Per Amps (MTPA) curve based on an autotune test for a motor;
generating a search zone for the MTPA curve for a given torque point, the search zone comprising an upper D-axis reference current and a lower D-axis reference current for the given torque point, wherein the MTPA curve comprises torque points of torques for current pairs of a Q-axis current and a D-axis current for the motor;
iteratively modifying a D-axis reference current between the upper D-axis reference current and the lower D-axis reference current of the search zone;
modifying a Q-axis reference current to output the given torque; and
updating a corresponding current pair of the given torque point to the modified D-axis reference current and the modified Q-axis reference current with a lowest current amplitude to further improve the efficiency of the motor.

11. The apparatus of claim 10, wherein the upper D-axis reference current and the lower D-axis reference are current limits and the D-axis reference current is iteratively modified by iteratively adding a D-axis reference current step to an initial D-axis reference current until the D-axis reference current exceeds a first current limit, iteratively subtracting the D-axis reference current step from the D-axis reference current until the D-axis reference current exceeds a second current limit, and iteratively adding the D-axis reference current step to the D-axis reference current until the D-axis reference current equals the initial D-axis reference current.

12. The apparatus of claim 11, wherein the initial D-axis reference current is equal to the D-axis reference current for the given torque point.

13. The apparatus of claim 11, wherein the D-axis reference current step is in the range of 5 percent to 20 percent of the search zone.

14. The apparatus of claim 10, wherein the upper D-axis reference current and the lower D-axis reference are current limits and the D-axis reference current is iteratively modified by iteratively adding a D-axis reference current step to an initial D-axis reference current that is equal to a second current limit until the D-axis reference current exceeds a first current limit.

15. The apparatus of claim 10, wherein the D-axis reference current, the D-axis reference current step is 20 percent of the search zone, and the D-axis reference current is iteratively modified to the lower D-axis reference plus one times the D-axis reference current step, two times the D-axis reference current step, and three times the D-axis reference current step, and a new upper D-axis reference current and lower D-axis reference are iteratively set to the modified D-axis reference current and modified Q-axis reference current with a lowest current amplitude plus and minus the D-axis reference current step respectively.

16. The apparatus of claim 10, the controller further:
performing the autotune test on the motor;
selecting at least three critical D-axis flux points in a knee portion on D-axis flux curve;
calculating torques as a function of D-axis current and Q-axis current;
estimating the initial MTPA curve;
determining whether an angular velocity of the motor is stable; and
determining whether a torque reference is stable.

17. The apparatus of claim 10, wherein the autotune test is a default operation.

18. The apparatus of claim 10, wherein the motor is a synchronous machine.

19. A system comprising:
a motor; and
a motor drive that performs:
generating an offline Maximum Torque Per Amps (MTPA) curve based on an autotune test for the motor;
generating a search zone for the MTPA curve for a given torque point, the search zone comprising an upper D-axis reference current and a lower D-axis reference current for the given torque point, wherein the MTPA curve comprises torque points of torques for current pairs of a Q-axis current and a D-axis current for the motor;
iteratively modifying a D-axis reference current between the upper D-axis reference current and the lower D-axis reference current of the search zone;
modifying a Q-axis reference current to output the given torque; and
updating a corresponding current pair of the given torque point to the modified D-axis reference current and the modified Q-axis reference current with a lowest current amplitude to further improve the efficiency of the motor.

20. The system of claim 19, wherein the upper D-axis reference current and the lower D-axis reference are current limits and the D-axis reference current is iteratively modified by iteratively adding a D-axis reference current step to an initial D-axis reference current until the D-axis reference current exceeds a first current limit, iteratively subtracting the D-axis reference current step from the D-axis reference current until the D-axis reference current exceeds a second current limit, and iteratively adding the D-axis reference current step to the D-axis reference current until the D-axis reference current equals the initial D-axis reference current.

* * * * *